May 20, 1941.  P. WILLS  2,242,564
SHOCK ABSORBER
Filed April 18, 1940
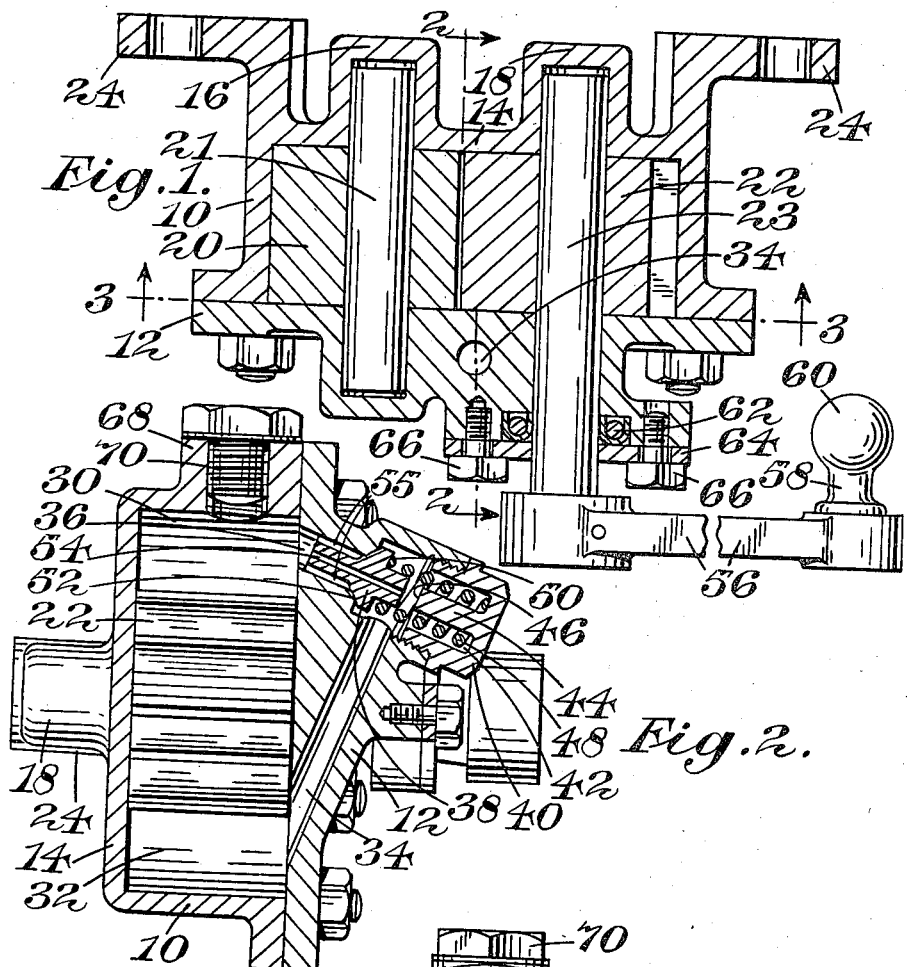
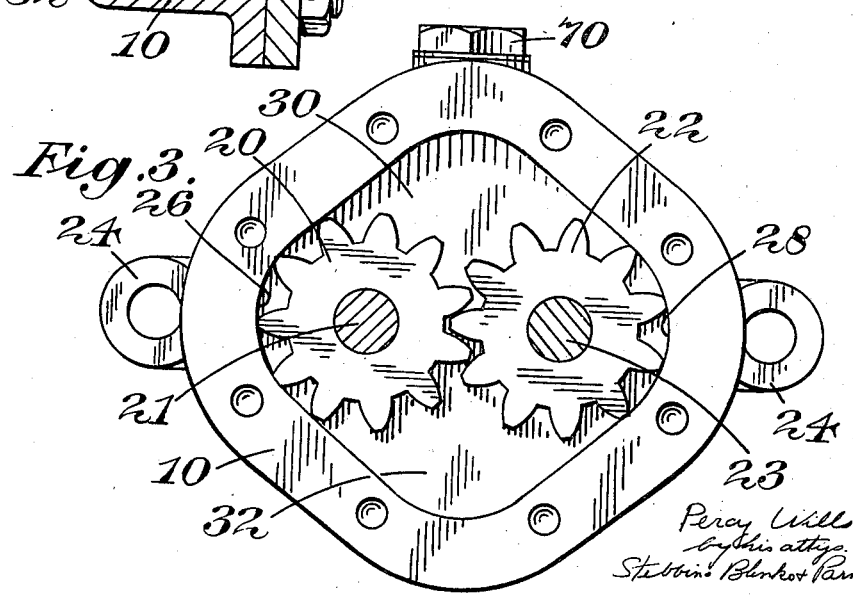
Percy Wills
by his attys.
Stebbins Blenko & Parmelee Patented May 20, 1941

2,242,564

UNITED STATES PATENT OFFICE 2,242,564

SHOCK ABSORBER

Percy Wills, Bridgwater, England, assignor to W. & F. Wills, Limited, Bridgwater, England, a British company Application April 18, 1940, Serial No. 330,343
In Great Britain May 16, 1939

1 Claim. (Cl. 188—89)

This invention relates to shock absorbers of the rotary type (hereinafter referred to as the type described) wherein a housing contains rotary impelling means arranged to be angularly reciprocated by an external operating member and thereby cause liquid or semi-liquid material in the housing to flow against a resistance in the housing and so absorb shock.

The present invention has for its main object to provide an improved construction of impelling means in a shock absorber of the type described adapted to operate efficiently and yet withstand sever shocks and rough usage.

According to the invention there is provided a shock absorber of the type described, wherein the impelling means is of the toothed gear-wheel type. Such impelling means is adapted for use with oil or grease, or some other liquid or semi-liquid substance with which the housing is filled, and is efficient in operation and able to withstand severe shocks and rough usage.

Preferably a pair of intermeshing gear wheels divides the interior of the housing into two compartments, and a conduit that provides the resistance to flow of fluid is arranged to place the two compartments in open communication one with the other.

In order to provide the resistance in the conduit, it may be valve-controlled, or it may comprise a duct of restricted cross-section, or it may have both of these features.

When a valve controlling the conduit is provided, it is preferably spring-loaded, and the duct of restricted cross-section may be situated in the valve member.

Conveniently a cover plate of a housing containing the impelling means may have the said conduit situated in it.

One embodiment of the invention is diagrammatically illustrated by way of example in the accompanying drawing, wherein:

Figure 1 is a horizontal section taken through one construction of shock absorber according to the invention, and Figures 2 and 3 are vertical sections taken respectively on the lines 2—2 in Figure 1 and 3—3 in Figure 2.

Like reference characters designate like parts throughout the several views.

Referring to the drawing, a shock absorber of the type described has a housing comprising a casing 10 of substantially oval shape in vertical longitudinal section with its major axis lying horizontally. This casing is open at the front and can be closed by a detachable cover plate 12, while its rear wall 14 is formed with two external bosses 16, 18 lying at the level of the major axis. A pair of intermeshing toothed gear wheels 20, 22 have their shafts 21, 23 journalled respectively at one end in the bosses, and at the other end in the cover plate. Perforated lugs 24 integral with the casing at the rear thereof serve for securing it in position. The casing has end arcuate portions 26, 28 with which the gear wheels 20, 22 respectively make a sliding fit, and the ends of the gear wheels fit snugly against the rear wall 14 of the casing and its cover plate 12, so that as described so far the gear wheels divide the chamber in the housing into closed upper and lower compartments 30, 32, respectively.

A conduit that provides the resistance to flow of fluid is arranged to place the two compartments 30, 32 in open communication one with the other. As illustrated the cover plate 12 contains a slanting conduit 34 which opens below into the lower compartment 32, and has at its upper end a branch 36 that lies at right angles thereto and opens into the upper compartment 30. This branch 36 forms a valve chamber which contains a valve member 38 and has its outer end closed by a screw cap 40. This cap has in its annular recess 42 surrounding a central portion 44 having at its inner end a face 46 constituting a stop for the valve member. A compression coil spring 48 is accommodated in the recess 42 and bears against one side of a shoulder 50 formed on the valve member 38, the other side of which shoulder is bevelled, and arranged to be seated on a correspondingly bevelled annular seat 52 formed in the valve chamber.

A duct 54 extends centrally longitudinally through the valve member 38, and is open at both ends and places the conduit 34 in open communication with the upper compartment 30. One or more longitudinal grooves 55 are formed in the stem of the valve member; these grooves 55 are closed at one end when the valve member is seated on the seat 52, but when the valve member is unseated they are open at both ends, so that fluid can flow through them as well as through the duct 54 from the compartment 30 to the conduit 34. The conduit 34 thus has at its upper end two branch passages opening into one end of the upper compartment 30, whereof the grooves 55 form one branch passage controlled by the valve member, and the other branch passage is constituted by the duct 54 that is of restricted cross-section as compared with the conduit 34 and forms a by-pass for the valve.

An operating arm 56 is keyed at one end on the spindle 23, and carries at its other end a transverse pin 58, preferably having a part-spherical portion 60 at the outer end, constituting a journal. This arm 56 may be bent so that the centre of the part 60 lies on a plane situated about midway between the front and rear of the housing of the shock absorber. The spindle 23 that extends through the cover plate 12 is packed therein by packing means 62 held in position by a plate 64 and studs 66.

The housing is filled with oil, grease or other convenient liquid or semi-liquid, referred to herein generally as fluid, and the shock-absorber operates as follows: The wheels 20, 22 constitute impellers, and when the operating arm 56 is rocked upwards, angular movement is imparted to the impellers and a difference of fluid pressure is produced in the two compartments 30, 32; the higher pressure in the upper compartment 30 forces the valve member 38 off its seat when the pressure is sufficient, but when the arm 56 moves downwards the valve member 38 is reseated and fluid can then flow not through the grooves 55, but only through the duct 54, thereby causing delayed action. In other words, when the pressure in the compartment 30 rises sufficiently to compress the spring 48 the valve member 38 is unseated and the excess pressure in the compartment 30 can escape to the compartment 32 by way of the valve seating 52 and the duct 34 as well as through the duct 54. On the other hand, when the fluid pressure rises in the compartment 32 the valve member 38 is forced by it on to its seat 52, and the excess pressure passes to the compartment 30 only relatively slowly, by way of the conduit 34 and duct 54, thereby causing delayed or obstructed motion of the part under control by the shock absorber.

For charging the housing, the casing may have at the top an inlet 68 closable by a screwthreaded plug 70.

I claim:

A shock absorber of the rotary type comprising a housing for containing a liquid or semi-liquid material, which housing comprises a casing and a detachable cover plate therefor, two shafts journalled each in the cover plate and in a wall of the casing opposite thereto, two intermeshing gear wheels constituting impellers that are mounted on said shafts and divide the interior of the casing into two compartments, a conduit that is formed in said cover plate and opens at one end into one of the compartments and has at its other end two branches which both open into the other compartment, a spring-loaded valve member arranged to control one of said branches, the other of which branches is a duct of restricted cross-section that extends through the valve member and forms a by-pass therefor, and an operating member mounted outside the casing on one of said shafts.

PERCY WILLS.